United States Patent

Ballarin et al.

[11] Patent Number: 6,009,125
[45] Date of Patent: Dec. 28, 1999

[54] DIGITAL TRANSMISSION SYSTEM THAT CAN BE SYNCHRONIZED WITH INITIALIZATION SEQUENCES

[75] Inventors: Bruno Ballarin, La Vareene St Hilaire; Antoine Chouly, Paris; Sabine Giorgi, La Varenne St Hilaire, all of France

[73] Assignee: U.S. Philips Corporation, New York, N.Y.

[21] Appl. No.: 08/526,024

[22] Filed: Sep. 8, 1995

[30] Foreign Application Priority Data

Sep. 13, 1994 [FR] France .................................. 94 10907

[51] Int. Cl.$^6$ .................................................. H04B 15/00
[52] U.S. Cl. .......................................... 375/285; 370/509
[58] Field of Search .................................... 375/229, 231, 375/219, 295, 222, 316, 354, 368, 365, 366, 259, 285, 208–210, 346, 348, 284, 278, 350, 343, 367; 370/509, 514, 503

[56] References Cited

U.S. PATENT DOCUMENTS

| | | |
|---|---|---|
| 3,757,221 | 9/1973 | Moehrmann . |
| 4,910,794 | 3/1990 | Mahany . |
| 5,164,959 | 11/1992 | Cai et al. . |
| 5,363,412 | 11/1994 | Love et al. ................................. 375/94 |
| 5,463,627 | 10/1995 | Matsuoka et al. ....................... 370/506 |
| 5,465,276 | 11/1995 | Larsson et al. .......................... 375/346 |
| 5,481,565 | 1/1996 | Pal ............................................ 375/229 |
| 5,487,085 | 1/1996 | Wong-lam et al. ...................... 375/229 |
| 5,502,749 | 3/1996 | Ozaki ....................................... 375/368 |

OTHER PUBLICATIONS

IEEE, 1980, "Frame Synchronization Techniques" by Robert A. Scholtz, pp. 1204–1213.

CCITT, The International Telegraph and Telephone Consultative Commitee, Recommendation V. 32 BIS Geneva 1991, pp. 1–22.

The DSP Implementation of a New Timing Recovery Technique for High Speed Digital Data Transmission, A.M.Gottlieb et al, Proceedings ICASSP 90, International Conference on Acoustics, Speech, and Signal Proceedings, vol. 1, 6 Avril 1990, pp. 1679–1682.

*Primary Examiner*—Chi H. Pham
*Assistant Examiner*—Jean B Corrielus
*Attorney, Agent, or Firm*—Steven R. Biren

[57] ABSTRACT

A digital transmission system includes a receiver which is synchronized with a transmitter wherein a correlation is established between a reference sequence and an initialization sequence transmitted by the transmitter. The system further includes an equalizer for operating with a first part of the initialization sequence, and a correlator for operating with a second part of the initialization sequence. This makes it possible to enhance the established correlation with the reference frequency and realize the synchronization, with great precision.

4 Claims, 3 Drawing Sheets

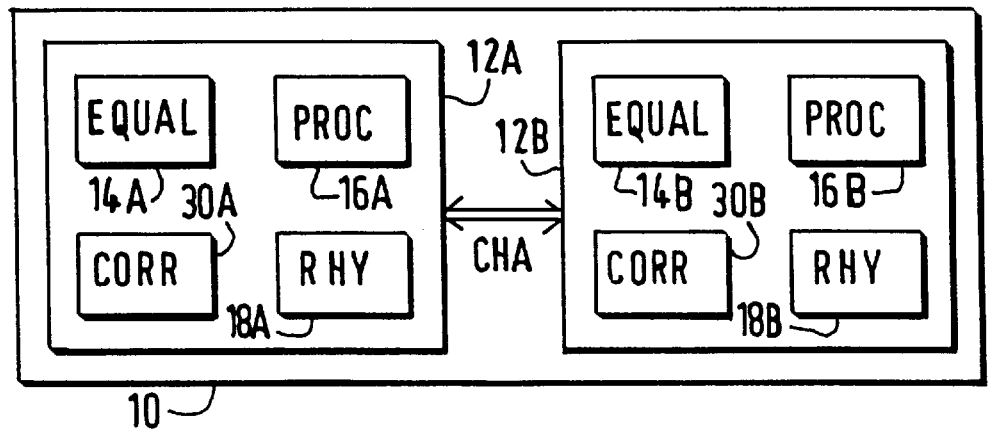
FIG. 1
FIG. 2
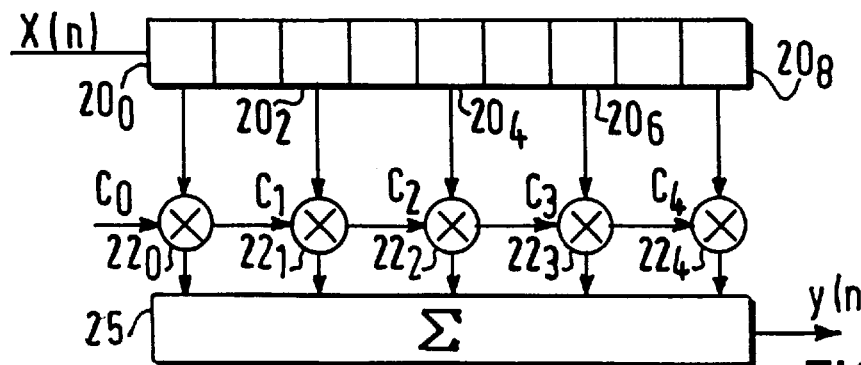
FIG. 3

DIGITAL TRANSMISSION SYSTEM THAT CAN BE SYNCHRONIZED WITH INITIALIZATION SEQUENCES

BACKGROUND OF THE INVENTION

1. Field of the Invention

The invention relates to a digital transmission system comprising at least a transmitter transmitting a signal that includes an initialization sequence and at least a receiver which is synchronized with the transmitter by correlation means which recognize the initialization sequence.

2. Discussion of the Related Art

It is a current problem to synchronize a signal receiver with a signal transmitter each placed at either end of a transmission channel. The synchronization may be realized by detecting a sequence transmitted at the initialization of the transmission.

The document "Frame Synchronization Techniques" R. A. SCHOLTZ, IEEE Transactions on Communications, Vol. COM-28, no. 8, 1980, pages 1204–1213 describes a frame synchronization technique based upon a correlation between an initialization sequence and a reference sequence. When the two sequences are identical, there is maximum correlation and a correlation signal is transmitted which is used for establishing the synchronization. But, such a technique has limited possibilities when the transmission channel produces distortion.

This situation occurs in digital transmission systems, for example, telephone systems, for which there is a transceiver operating in the transmit mode at one end of a channel, whereas at the other end there is another transceiver operating in the receive mode, and vice versa. In such a bidirectional mode of operation it is necessary to synchronize the two transceivers with each other during an initialization period. To provide this synchronization, one uses synchronizing signals transmitted by the transmitter and identified by the receiver. To obviate these synchronization problems caused by transmnission channels, the synchronizing signals are initialization sequences. The synchronization of the receiver may be obtained by making use of the repetition of the signals transmitted by the transmitter.

It is necessary to identify precisely the moment at which the receiver has recognized the initialization sequence, because a poor precision results in synchronization defects and/or excessive complexity of the receiving material.

SUMMARY OF THE INVENTION

It is an object of the invention to determine said moment with great precision, even if distortion occurs caused by the channel or even if noise occurs.

This object is achieved with a system for which, when the initialization sequence comprises a preamble followed by a reference sequence, the correlation means follow equalization means which equalize the received signal with the preamble, while the correlation means effect the correlation with the reference sequence.

In this manner, the correlation means can advantageously work with signals perfectly equalized with the preamble of the initialization sequence, which makes it possible to detect extremely precisely the occurrence of the reference sequence.

In the case of a signal modulated on the basis of states of a constellation, the preamble is formed by a first state series. This series is preferably repetitive to reduce the hardware and accelerate the equalization.

For enhancing the performance of the correlation, the reference sequence thus comprises a first part which prolongs the state series of the preamble, this first part being juxtaposed with a second part formed by another state series. This makes it possible to detect very precisely the occurrence of the transition situated at the juxtaposition of the first part and the second part of the reference sequence and to effect the synchronization with great precision even with a low signal-to-noise ratio.

These and other aspects of the invention will be apparent from and elucidated with reference to the embodiments described hereinafter.

BRIEF DESCRIPTION OF THE DRAWINGS

In the drawings:

FIG. 1: gives a representation of a QAM4 constellation,

FIG. 2: shows a diagram of a transmission system according to the invention,

FIG. 3: shows a diagram of an equalizer according to the invention,

DETAILED DESCRIPTION OF THE PREFERRED EMBODIMENTS

Figure 4:
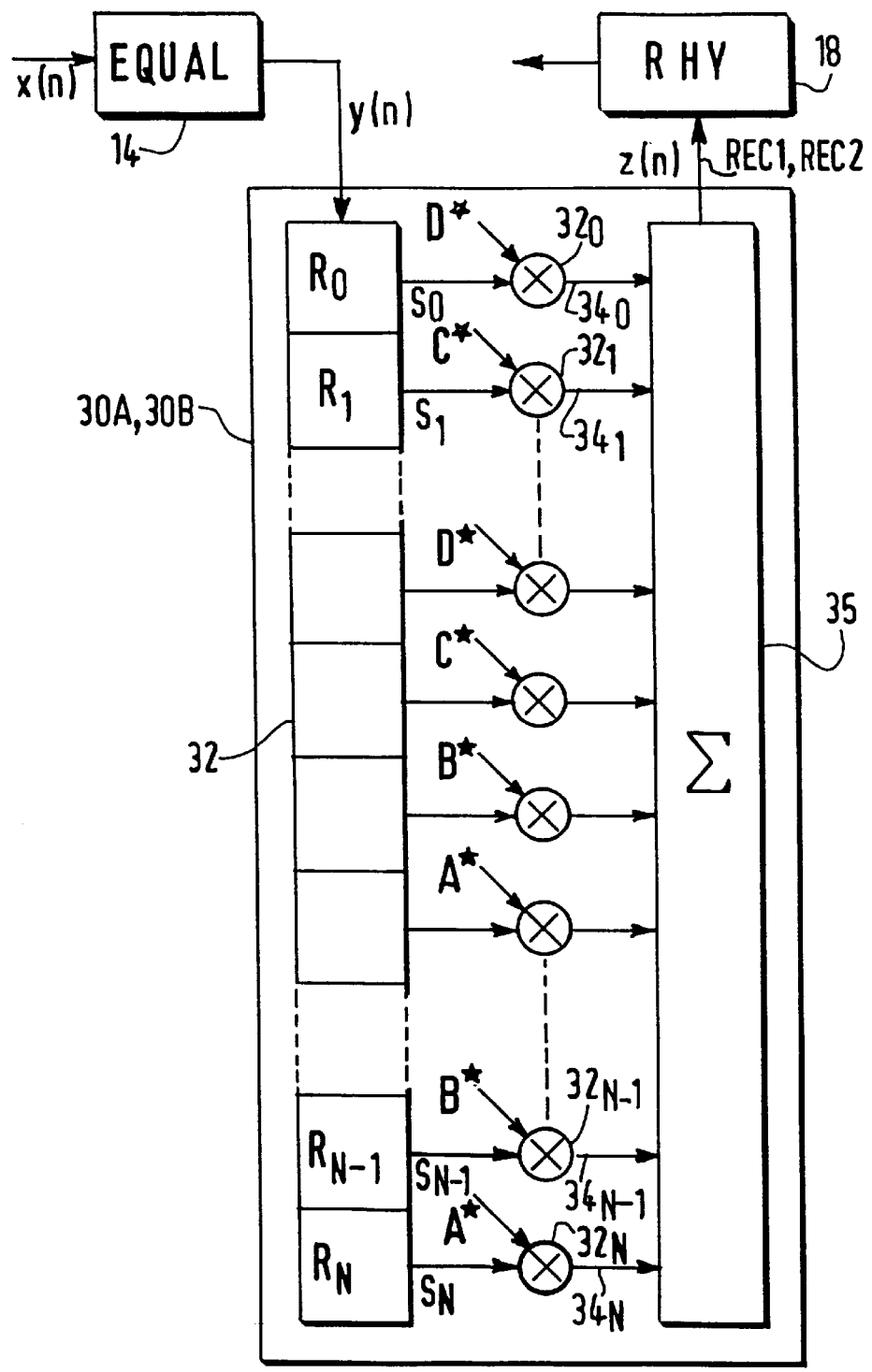
FIG. 4 shows a diagram of correlation means according to the invention.

By way of example the following description relates to a QAM4 modulation, represented in FIG. 1, used for synchronizing a transmission modem which is in conformity with the standards of the V series defined by the International Telegraph and 5 Telephone Consultative Committee (CCITT), which standards are published by the International Telecommunication Union, Geneva, (1991). Nevertheless, the invention may be; utilized for synchronizing other systems with or without standards, which utilize other initialization sequences.

Let us consider by way of example the case where there is a transceiver at either end of the channel to constitute a bidirectional link.

FIG. 2 shows a digital transmission system 10 which comprises a first signal transceiver 12 A placed at one end of a channel CHA, and a second transceiver 12B placed at the other end. The signals to be transmitted, for example, for applications in the field of telephony, are coded with the aid of the QAM4 constellation shown in FIG. 1. We are facing a four-state constellation: A(−6,−2); B(2,−6); C(6,2); D(−2, 6).

According to the invention, each transceiver comprises correlation mean CORR, 30A, 30B which follow equalization means EQUAL 14A, 14B which correct the distortion of the signals which distortion is due to their being transmitted. Each transceiver also comprises processing means PROC 16A, 16B, which influence the equalized signals, and timing means RHY 18A, 18B which produce the timing signals necessary for the transmission system. The equalization means 14A, 14B are used for the synchronization. The processing means further include their own equalizers which influence the data that contain the information to be transmitted. According to above standard, the initialization sequence is formed by a first series which repeats signals modulated by the states A and B of the constellation in the order ABABAB . . . which takes place over 256 clock symbol periods of initial duration T. At the end of the 256 periods, the first series is replaced by the second series which repeats signals modulated by the states C and D of the constellation in the order CDCDCD . . . which takes place over 16 clock symbol periods.

The mutual synchronization of the first and second transceivers consist of detecting the moment at which the transition between the series of states AB and the series of states CD appears, and of synchronizing the timing means.

The equalization according to the invention is effected over, for example, 200 symbols of the order ABABAB . . . . These 200 symbols form the preamble in the meaning of the invention. At the end of this preamble, the equalization with the preamble is stopped and the correlation may be effected with the remaining symbols AB and symbols CD. The reference sequence thus comprises the symbols placed on either side of the transition, that is to say, symbols AB and symbols CD. With a deterministic series ABABAB . . . the equalization tends towards calculating equalization factors belonging to this equalization series. This deterministic series is not of necessity adapted to the symbols CD. Nevertheless, this equaliztion with the symbols AB is decisive for increasing the correlation peak which appears at the instant of the transition.

Thus, when the next series CDCD . . . presents itself, the correlation means CORR, 30A, 30B can precisely detect when the moment of the transition between states A, B and the states C, D of the initialization sequence occurs.

FIG. 3 shows a preferred illustrative embodiment for an equalizer according to the invention. It comprises a shift register formed by cells 200 to $20_8$, while the shift is carried out with a clock T/3, that is to say, three times higher than that of the symbol clock T of the input signals x(n). The output signal of every second cell, that is to say, of cells $20_0$, $20_2$, $20_4$, $20_6$, $20_8$ enters a multiplier $22_0$ to $22_4$ which also receives a weighting factor C0, C1, C2, C3, C4. The output signals of the five multipliers are added together in a summator $\Sigma$ 25 which produces the equalized signal y(n) which enters the correlation means shown in FIG. 4.

The signal y(n) enters in-line a shift register 32 formed by elementary cells $R_0$, $R_1$, . . . $R_{N-1}$, $R_N$ where N+1 is the length of the reference sequence. The output signal of each cell $S_0$, $S_1$, . . . $S_{N-1}$, $S_N$ enters multiplier means $32_0$, $32_1$ . . . $32_{N-1}$, $32_N$ which respectively receive on one input an output signal $S_0$, $S_1$, . . . or $S_N$ and on another input a conjugate state of the constellation that forms the reference sequence. The distribution of the reference sequence is made in such a way that the multiplier means $32_0$ receive the conjugate of the last state of the reference sequence, that the multiplier means $32_N$ receive the conjugate of the first state of the reference sequence, and that the intermediate multiplier means receive each in succession a conjugate of the intermediate states of the reference sequence. All the output signals $34_0$, $34_1$, . . . $34_{N-1}$, $34_N$ of the multiplier means are summed in a summator 35 which produces an output signal z(n) according to the equation:

$$z(n) = \sum_{i=0}^{i=N} y(n-i) \cdot r*(i)$$

The reference sequence may, for example, be the sequence: r*(i) =A*B*A*B*A*B*A*B*C*D*C*D*C*D*C*D* which comprises 16 conjugate states formed by two groups of 8 conjugate states spread over either side of the transition.

The reference sequence may be short to restrict the necessary hardware means for utilizing the correlation.

When the succession of incident sequences dwells in the cells $R_O$, . . . $R_N$, there is a moment when the result of the multiplication of the sequence, which at this instant is found in the cells $R_O$ . . . $R_N$ by the reference sequence described above, produces a maximum output signal z(n). The instant of the transition may thus be determined very precisely.

Figure 5:
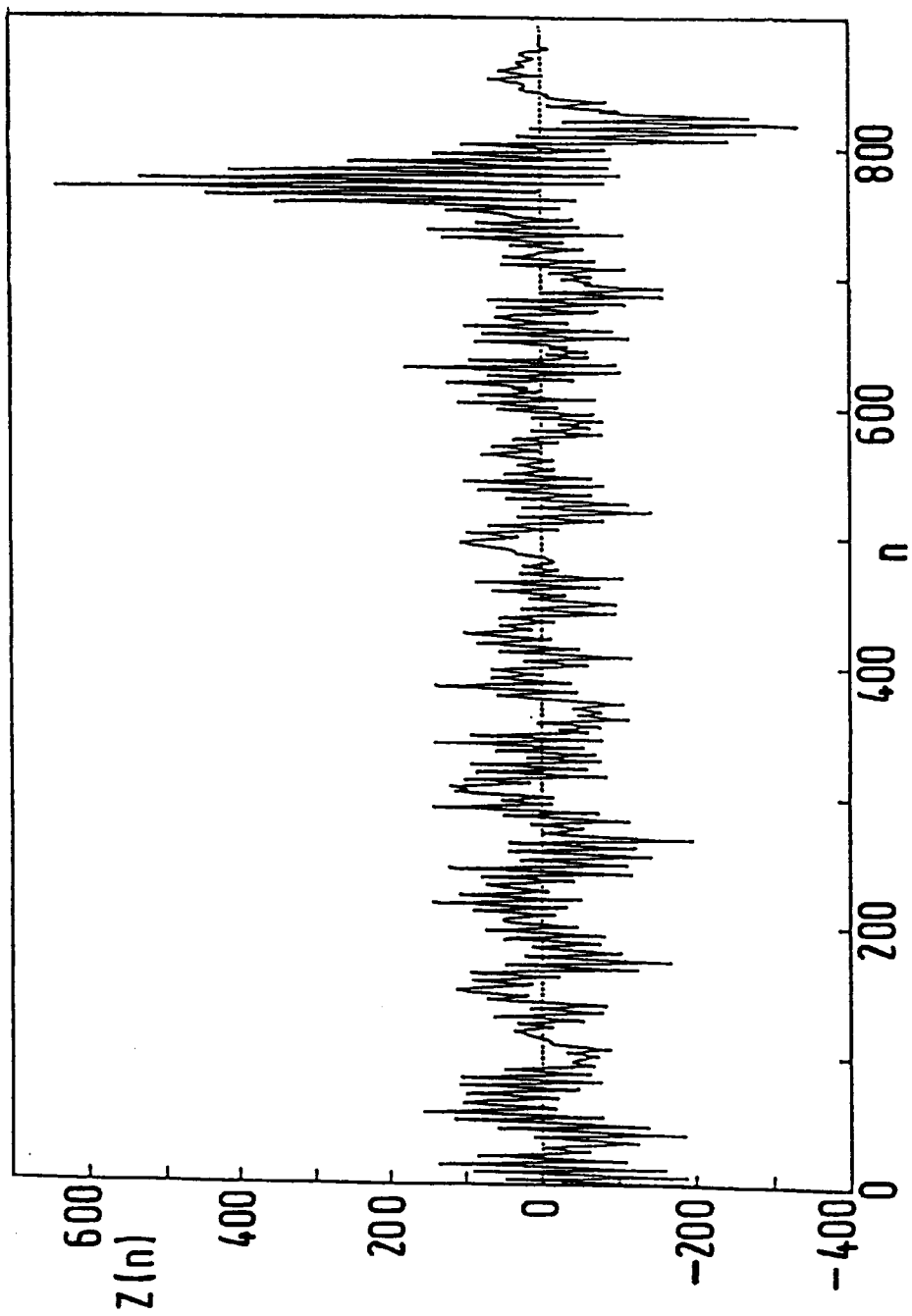
FIG. 5: shows a graph demonstrating the variations of the output signal of the correlation means.

FIG. 5 is a graphic representation of the variations of the output signal z(n) in the case of a 6 dB signal-to-noise ratio. This signal remains erratic (representing the noise) until the transition between the states A B and the states C D is correctly positioned in the cells $R_O$ . . . $R_N$. The output signal z(n) thus shows a peak which is used by the timing means 18 as a reconnaissance signal REC1, REC2 for triggering and synchronizing respectively, the two transceivers.

It will be noticed that the signal z(n) is a discrete sequence of correlation values. Near the maximum correlation, the timing means 18A, 18B identify the exact position of the central peak that corresponds to the maximum correlation. Therefore, consecutive values . . . z(n+k−1), z(n+k), z(n+k+1) . . . , where n is a current index, are compared in pairs. The maximum value of z makes it possible to determine the sample, for example, sample (n+k), at which the maximum value appears. As the composition of the initialization sequence is known, the approximate position k of the maximum z is known beforehand, which makes it possible to stop the procedure of the correlation when the transition is certainly passed (delay td). By delaying the data to be processed in a corresponding manner (delay equal to td) in the processing means 16A, 16B, it is then possible to synchronize the timing means and the processing means with the transition instant.

The maximum correlation is particularly sharp, which makes it possible to locate the maximum at ±1 sample, which considerably simplifies the complexity of the hardware of the system. Nevertheless, taking the noise into account, the central peak may have higher additive noise than a side peak which may be the real maximum. Therefore, it is possible to use various processing equalizers in the processing means set to the central peak and to various side peaks, respectively. With a precision of ±1 sample, the invention makes it possible to considerably reduce this multiplicity of upstream processing equalizers.

The invention has been described with means carrying out the correlation by using multipliers to multiply incident sequences by a reference sequence formed by conjugate states. It is possible though to implement the correlation measures differently, for example, by a digital signal processor programmed for performing the correlation.

We claim:

1. A digital transmission system comprising:

at least a transmitter for transmitting a signal that includes an initialization sequence and distortion due to the transmission; and at least a receiver, said receiver having synchronization means comprising correlation means for recognizing the initialization sequence, said receiver being synchronized with the transmitter by the correlation means, wherein the initialization sequence comprises a preamble followed by a reference sequence, said synchronization means further comprising equalization means for synchronization upstream of said correlation means for compensating for said distortion which is adaptive during the reception of said preamble, said equalization means generating an equalized signal, and the correlation means effecting the correlation of the equalized signal on said reference sequence to synchronize the receiver with the transmitter.

2. The system as claimed in claim 1, wherein the signal is modulated based upon states of a constellation, wherein the preamble is formed by a first state series and the reference sequence comprises a first part formed by a continuation of the first state series, juxtaposed with a second part formed by a second state series.

3. The system as claimed in claim 2, further wherein the first series and the second series are repetitive series.

4. The system as claimed in claim 2, wherein the reference sequence is formed by conjugate states of initialization sequence states.

* * * * *